United States Patent [19]
Stegmaier

[11] Patent Number: 5,443,308
[45] Date of Patent: Aug. 22, 1995

[54] PRESSURE MODULATOR

[75] Inventor: Alwin Stegmaier, Charleston, S.C.

[73] Assignee: Robert Bosch GmbH, Stuttgart, Germany

[21] Appl. No.: 244,226

[22] PCT Filed: Sep. 24, 1992

[86] PCT No.: PCT/DE92/00819
§ 371 Date: May 23, 1994
§ 102(e) Date: May 23, 1994

[87] PCT Pub. No.: WO93/09985
PCT Pub. Date: May 27, 1993

[30] Foreign Application Priority Data
Nov. 22, 1991 [DE] Germany .......... 41 38 410.5

[51] Int. Cl.⁶ .............................................. B60T 8/42
[52] U.S. Cl. .............................. 303/115.4; 303/117.1
[58] Field of Search .............. 303/115.1, 115.4, 116.2, 303/117.1, 9.61, 9.72, 9.75, 113.2, 113.5, DIG. 1, DIG. 2, 901

[56] References Cited
U.S. PATENT DOCUMENTS

| 4,773,715 | 9/1988 | Farr | 303/115.6 |
| 4,799,742 | 1/1989 | May et al. | 303/115.3 |
| 4,861,116 | 9/1989 | Bernhardt et al. | 303/100 |
| 5,273,348 | 12/1993 | Yagi et al. | 303/117.1 X |
| 5,328,257 | 7/1994 | Tsukamoto | 303/117.1 X |

Primary Examiner—Josie A. Ballato
Attorney, Agent, or Firm—Edwin E. Greigg; Ronald E. Greigg

[57] ABSTRACT

A pressure modulator for a hydraulic brake system having a first cylinder bore with a servo piston, a second cylinder bore with a control piston, and a guide bore connecting the first cylinder bore to the second cylinder bore, in which a control tappet is disposed in a guide bore. An exact guidance of the servo piston in the first cylinder bore of the pressure modulator is assured. A control tappet is arranged, in the guide bore and the servo piston, on an end toward the control tappet, has a tappet extension that protrudes into the guide bore of the housing. In this way, exact guidance of the servo piston is assured. The novel pressure modulator is especially suitable for hydraulic brake systems of motor vehicles.

4 Claims, 4 Drawing Sheets

PRESSURE MODULATOR

BACKGROUND OF THE INVENTION

The invention is based on a pressure modulator for a hydraulic brake system, especially a motor vehicle brake system. A pressure modulator that is used to modulate the pressure of the pressure fluid in the wheel brake cylinders is already known from German Patent Disclosure DE 37 41 310 A1, U.S. Pat. No. 4,461,116. This pressure modulator has a first cylinder with a servo piston, a second cylinder with a control piston, and a guide bore which connects the first cylinder with the second cylinder and in which a control tappet is disposed. The control tappet is located in the first cylinder at one face end of the servo piston and in the second cylinder at one face end of the control piston. In the second cylinder, a shutoff valve is disposed offset from a longitudinal axis of the pressure modulator. In this kind of pressure modulator, exact guidance of the servo piston in the first cylinder is not always assured, because the imposition of pressure on the servo piston by the pressure fluid creates the danger of a skewed position and therefore of leakage from the pressure modulator. The production of the eccentrically disposed shutoff valve requires high production expense.

ADVANTAGES OF THE INVENTION

The pressure modulator according to the invention has the advantage over the prior art of very exact guidance of the servo piston in the first cylinder by its tappet extension in the guide bore of the housing. In this way, skewing of the servo piston in the first cylinder is prevented, and the danger of resultant leakage from the pressure modulator is reduced. The pressure modulator can be manufactured economically. When used in a motor vehicle brake system with an anti-lock and traction control system, it enables simpler design and a smaller number of individual units in the brake system.

Advantageous further features of and improvements to the brake system are possible with the provisions recited hereinafter.

For an especially simple, economical design and exact actuation of the shutoff valve, it is advantageous if the control tappet, on its end protruding from the guide bore, has a recess open toward its face end toward the control piston, into which recess the actuation member protrudes with a crossbar extending at right angles to the longitudinal axis, the length of the recess in the direction of the longitudinal axis being greater than the length of the crossbar in the direction of the longitudinal axis, and if an actuation pin of the actuation member, which protrudes into the through bore of the control piston, extends in the direction toward the closing body, beginning at the crossbar.

It is advantageous if the actuation member is embodied as a part stamped from a metal material, so that it can be manufactured simply and economically.

To assure reliable closure of the shutoff valve, it is advantageous if the shutoff valve has the second compression spring, which exerts a spring force in the direction of the valve seat upon the closing body.

It is advantageous if the second compression spring is supported on a spring plate that in turn is pressed by the first compression spring against the control piston. This produces a very compact embodiment of the pressure modulator, which has a short structural length.

For the same reason, it is likewise advantageous if the second compression spring is embodied as a leaf spring with a spring tongue.

It is advantageous if the through bore of the control piston, on one end, has at least one radially inward-pointing retention protrusion, and if the closing body is disposed between the valve seat and the at least one retention protrusion, so that the stroke of the closing body is limited in the direction remote from the valve seat.

BRIEF DESCRIPTION OF THE DRAWING

Exemplary embodiments of the invention are shown in simplified form in the drawings and described in detail in the ensuing description. Shown are FIG. 1, a circuit diagram of a hydraulic brake system with a pressure modulator in accordance with a first exemplary embodiment of the invention.

DESCRIPTION OF THE EXEMPLARY EMBODIMENTS

Figure 1:
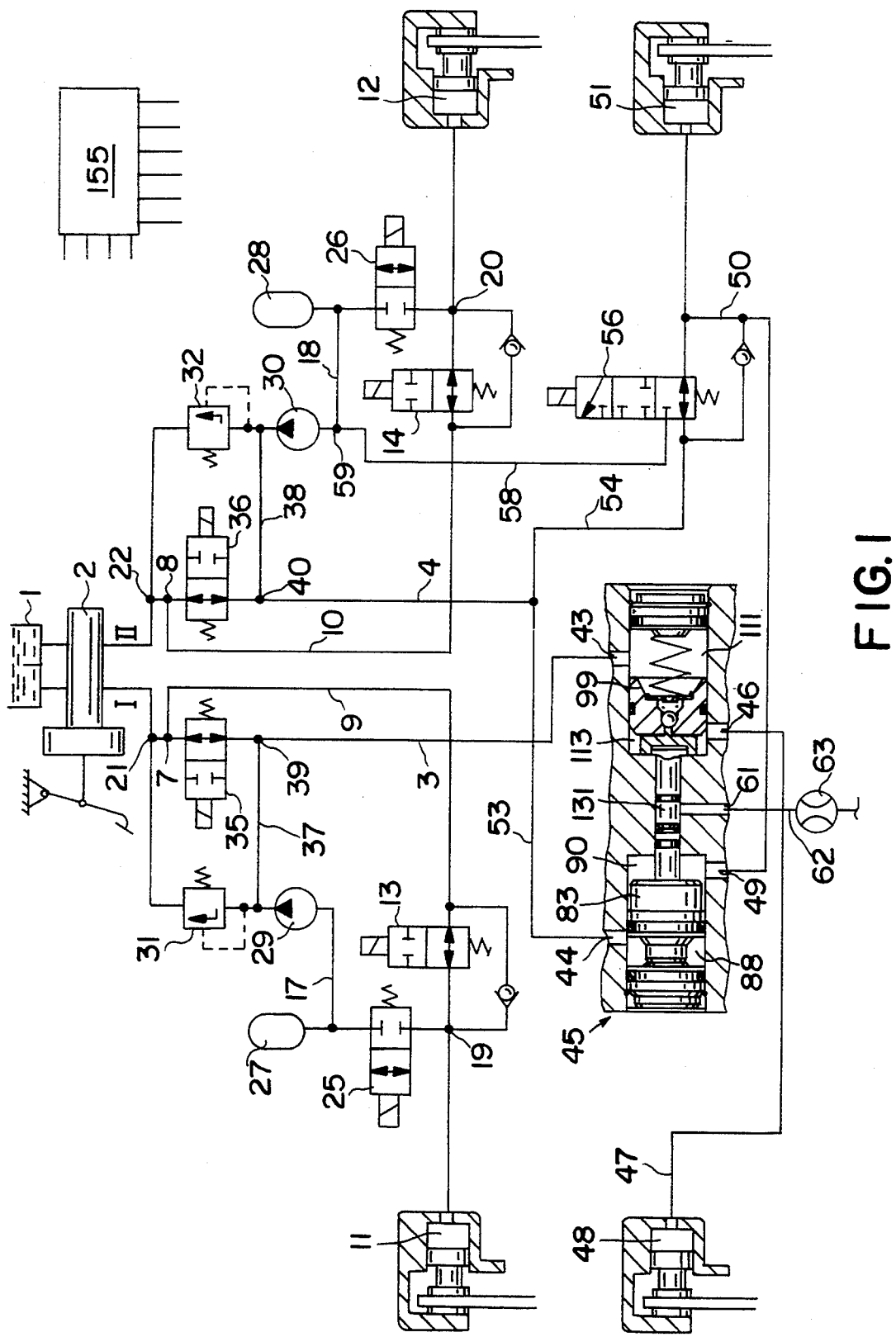

The hydraulic motor vehicle brake system having an anti-lock and traction control arrangement, shown by way of example in FIG. 1, has a pedal-actuated master cylinder 2, which communicates with a supply tank 1 and to which two brake circuits I and II are connected by means of a first brake line 3 and a second brake line 4. From the brake lines 3; 4, a first and second brake line branch 9 and 10, respectively, branch off from a respective junction 7; 8; each brake line branch is associated with each of one wheel brake cylinder 11 and 12, respectively. A first inlet valve 13 and a second inlet valve 14, for instance in the form of a 2/2-way magnet valve that is open when without current, is disposed in the respective brake line branches 9 and 10. Branching off from the brake line branches 9; 10 on the wheel brake cylinder side of the inlet valve 13; 14 are, respectively, a first return line branch 17 and a second return line branch 18, the branching taking place at junctions 19; 20. The first return line branch 17 communicates with the first brake line 3 at a junction 21 provided on the master cylinder side of the junction 7, and the second return line branch 18 communicates with the second brake line 4 at a junction 22 provided on the master cylinder side of the junction 8. In the return line branches 17; 18, a first outlet valve 25 and a second outlet valve 26 are disposed for instance in the form of 2/2-way magnet valves that are closed when without current, and that enable a pressure reduction in the respective wheel brake cylinders 11; 12. In the return line branches 17; 18, a respective storage chamber 27; 28, a respective return pump 29; 30, and a respective follower valve 31; 32 are provided in succession in the return line branches 17; 18, downstream of the outlet valves 25; 26 in the return flow direction toward the junctions 21 and 22.

A first control valve 35 and a second control valve 36, each embodied for example as a 2/2-magnet valve that is closed when without current, are disposed, each in the respective brake lines 3; 4, remote from the master cylinder side of the junction 7; 8. From the return line branches 17; 18, one connecting line 37; 38 branches off on the pressure side of each return pump 29; 30 and at a respective junction 39 and 40 establishes communication with the brake line 3 and 4 on the side of the applicable control valve 35; 36 remote from the master cylinder 2.

The brake line 3 communicates on its end remote from the master cylinder 2 with a first inlet conduit 43, and the second brake line 4 communicates by a first line branch 53 remote from the master cylinder 2 with a second inlet conduit 44 of a pressure modulator 45. The pressure modulator has a first outlet conduit 46, which via a first brake line segment 47 communicates with a wheel brake cylinder 48, and a second outlet conduit 49, which via a second brake line segment 50 communicates with a wheel brake cylinder 51. The wheel brake cylinders 48, 51 serve for example to brake the driven wheels of the vehicle, while the wheel brake cylinders 11, 12 are provided on the nondriven wheels of the vehicle.

The second brake line 4 communicates with a second brake line branch 54 remote from the master cylinder 2, for instance via a valve assembly 56 on the master cylinder side associated with the wheel brake cylinder 51. On the wheel brake cylinder side, the valve assembly 56 communicates with the wheel brake cylinder 51 and the second brake line segment 50. A return flow line 58 begins at the master cylinder side of the valve assembly 56 and communicates with the second return line branch 18 at a junction 59 on the intake side of the return pump 30.

The valve assembly 56 is embodied as a 3/3-way magnet valve, for example, which in the currentless state establishes a flow from the second brake line branch 54 of the second brake line 4 to the wheel brake cylinder 51. In a magnet-actuated second position, the valve assembly 56 is in its blocking position, while in a magnet-actuated third position the valve assembly 56 establishes a flow from its wheel brake cylinder side, that is, from the wheel brake cylinder 51 and the second brake line segment 50, to the return line 58 in the direction of the return pump 30.

The pressure modulator 45 has a leakage conduit 61, through which pressure fluid that is liberated by possible leaks of the pressure modulator, can escape. This leakage conduit 61 communicates via a leakage line 62 with a leak quantity measuring instrument 63, which ascertains any possible leakage quantities and informs the driver of the motor vehicle of this, for instance by lighting up a warning light.

Figure 2:
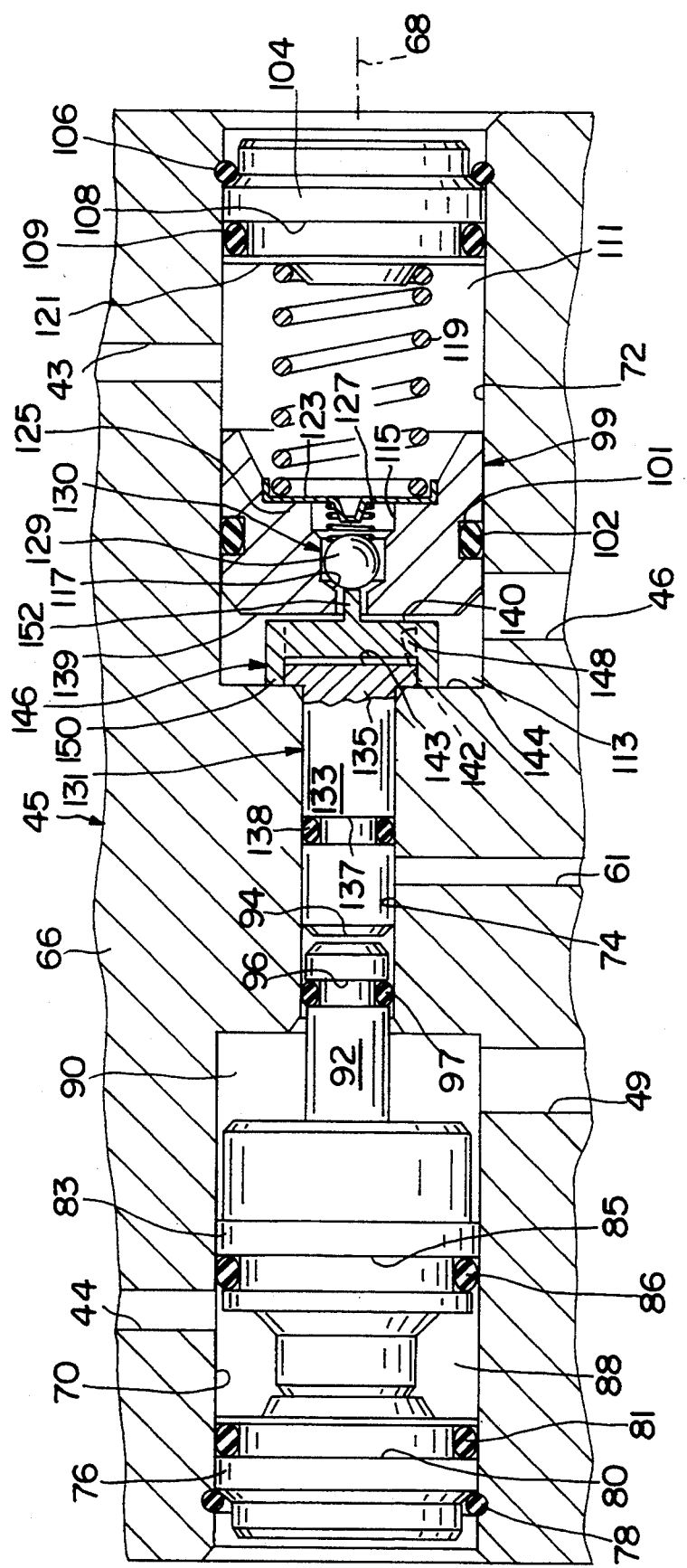
FIG. 2, a pressure modulator of the first exemplary embodiment, on a larger scale.
Figure 3:
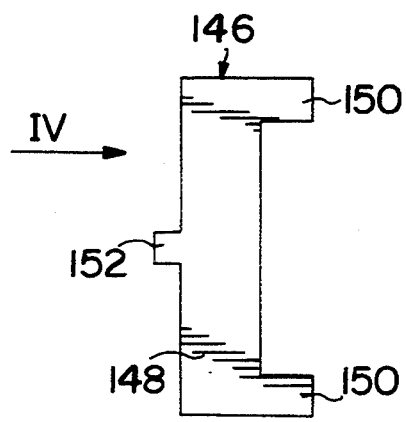
FIG. 3, an elevation view, greatly enlarged, of an actuation member of the pressure modulator in the first exemplary embodiment.
Figure 4:
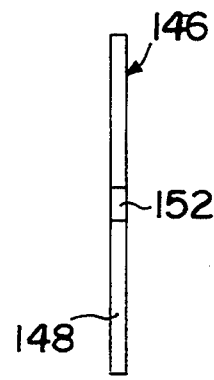
FIG. 4, an elevation view of the actuation member in the direction of the arrow IV of FIG. 3.
Figure 5:
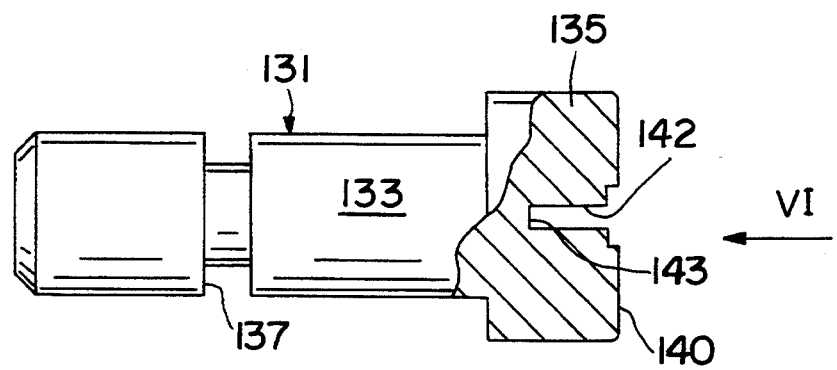
FIG. 5, a greatly enlarged elevation view of a control tappet of the pressure modulator of the first exemplary embodiment.
Figure 6:
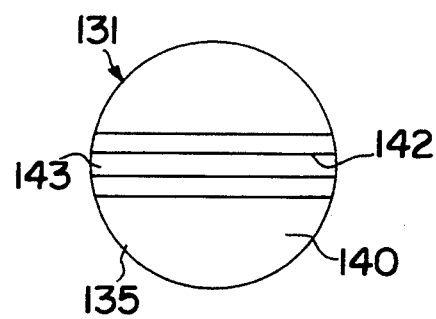
FIG. 6, an elevation view of the control tappet in the direction of the arrow VI in FIG. 5.

FIG. 2 shows a greatly enlarged pressure modulator 45, in accordance with the first exemplary embodiment of the invention as shown in FIG. 1. FIGS. 3 and 4 show elevation views of the actuation member 146, and FIGS. 5 and 6 show elevation views of the control tappet 131 of the pressure modulator 45.

In a housing 66, the pressure modulator 45 has a first cylinder bore 70, a second cylinder bore 72, and a guide bore 74 that connects the first cylinder bore 70 to the second cylinder bore 72, all these being concentric with a longitudinal axis 68. On its end remote from the guide bore 74, a closure plug 76 is for instance press-fitted or screwed into the first cylinder bore 70, closing off the first cylinder bore 70 from the outside. A first sealing ring 78 is disposed on the circumference of the first closure plug 76, remote from the guide bore 74, and a second sealing ring 81 is disposed, toward the guide bore 74, in a first annular groove 80 of the first closure plug 76; both sealing rings rest tightly against the wall of the first cylinder bore 70. The sealing rings 78, 81 assure that no pressure fluid will escape to the outside from the first cylinder bore 70.

A stepped servo piston 83 is disposed in the first cylinder bore 70; it is displaceable in the direction of the longitudinal axis 68 and in part has a diameter only slightly smaller than the diameter of the first cylinder bore 70. An annular groove 85 is disposed on the circumference of the stepped servo piston 83, and disposed in this annular groove is a sealing ring 86 that rests tightly against the wall of the first cylinder bore 70. The servo piston 83 subdivides the first cylinder bore 70 into a servo chamber 88 oriented toward the first closure plug 76 and a first cylinder chamber 90 oriented toward the guide bore 74. The servo chamber 88 communicates with the second inlet conduit 44, which for instance extends at right angles to the longitudinal axis 68 in the housing 66 and which forms a segment of the first line branch 58 of the second brake line 4, and the first cylinder chamber 90 communicates with the second outlet conduit 49, which for instance extends at right angles to the longitudinal axis 68 in the housing 66 and forms one segment of the second brake line segment 50.

On the servo piston 83, remote from the first closure plug 76, a tappet extension 92 is formed that extends concentrically to the longitudinal axis 68 and protrudes part way into the guide bore 74. By way of example, the tappet extension 92 of the servo piston 83 has a slightly smaller diameter than the diameter of the guide bore 74, and it assures accurate guidance of the servo piston 83. On its circumference, near its face end 94 toward the second cylinder bore 72, the tappet extension 92 has an annular groove 96, in which a sealing ring 97 is disposed. The sealing ring 97 rests tightly against the wall of the guide bore 74.

A control piston 99 is disposed in the second cylinder bore 72; it is displaceable in the direction of the longitudinal axis 68, and it has an only slightly smaller diameter than the diameter of the second cylinder bore 72. An annular groove 101 is formed on the circumference of the control piston 99, and a sealing ring 102 resting tightly against the wall of the second cylinder bore 72 is disposed in that annular groove. A second closure plug 104 is for instance press-fitted or screwed into the second cylinder bore 72, on its end remote from the guide bore 74, and closes off the second cylinder bore 72 toward the outside. On the circumference of the second closure plug 104, a third sealing ring 106 is disposed remote from the control piston 99, and a fourth sealing ring 109 is disposed toward the control piston, in a second annular groove 108. The sealing rings 106, 109 both rest tightly against the wall of the second cylinder bore 72 and assure that no pressure fluid will escape to the outside from the second cylinder bore 72.

The control piston 99 subdivides the second cylinder bore 72 into a control chamber 111 toward the second closure plug 104 and a second cylinder chamber 113 toward the guide bore 74. The control chamber 111 communicates with the first inlet conduit 43, which forms one segment of the first brake line 3 and for instance extends at right angles to the longitudinal axis 68 in the housing 66; and the second cylinder chamber 113 communicates with the first outlet conduit 46, which forms one segment of the first brake line segment 47 and for instance extends at right angles to the longitudinal axis 68 in the housing 66.

Concentric with the longitudinal axis 68, the control piston 99 has a continuous stepped through bore 115. A valve seat 117 is formed in the through bore 115 and tapers frustoconically toward the second cylinder chamber 113. In the axial direction between the control piston 99 and the second closure plug 104, a first compression spring 119 is provided, for instance in the form of a helical spring. The compression spring 119 is supported by one end on a face end 121 toward the control piston 99 of the second closure plug 104, and with its other end it rests on a spring plate 123, which in turn rests on a retention shoulder 125, toward the second closure plug 104, of the stepped through bore 115 of the control piston 99.

Supported on the spring plate 123, remote from the first compression spring 119, is a second compression spring 127, disposed in the through bore 115 of the control piston 99; this spring urges a closing body 129, of spherical shape, for instance, toward the frustoconical valve seat 117 and thus seeks to close the shutoff valve 130, comprising the valve seat 117, the second compression spring 127, and the closing body 129, in order to disconnect the second cylinder chamber 113 from the control chamber 111.

Beginning at the second control chamber 113 of the cylinder 72, a control tappet 131 protrudes with a cylindrical guide segment 133 into the guide bore 74. The guide segment 133 by way of example has a slightly smaller diameter than the guide bore 74. On its end protruding from the guide bore 74, an operative segment 135, for instance cylindrical, which has a markedly larger diameter than the diameter of the guide bore 74, is formed on the control tappet 131.

On the circumference of the guide segment 133 of the control tappet 131, remote from the operative segment 135, an annular groove 137 is provided, in which a sealing ring 138 is disposed that rests tightly against the wall of the guide bore 74. Between the sealing ring 138 of the control tappet 131 and the sealing ring 97 of the tappet extension 92 of the servo piston 83, the leakage conduit 61 is formed in the housing 66, for instance extending at right angles to the longitudinal axis 68, this conduit being open toward the guide bore 74 and communicating with the leakage quantity measuring instrument 63, which ascertains any quantity of leakage of pressure fluid that might be flowing past the sealing rings 138 and 97.

The operative segment 135 of the control tappet 131, on a face end 140 oriented toward a bearing end face 139 of the control piston 99, has a recess 142, of slitlike form, for instance, having a bottom 143 in the form of a transverse groove, as shown for instance in FIGS. 5 and 6.

In the direction of the longitudinal axis 68, between the control piston 99 and a face end 144, toward the second closure plug 104, of the second cylinder bore 72, there is an actuation member 146. The actuation member 146 has a crossbar 148, which extends at right angles to the longitudinal axis 68 and in the direction of the longitudinal axis 68 protrudes, for instance all the way, into the recess 142 of the control tappet 131 and in this way is securely held in the control piston 99. Parallel to the longitudinal axis 68, the platelike actuation member 146 has one longitudinal bar 150, extending toward the face end 144, on each of the radially outer ends of its crossbar 148; this longitudinal bar fits at least partway over the operative segment 135 of the control tappet 131 in the axial direction. Beginning at the crossbar 148, an actuation pin 152 of the actuation member 146, which pin for instance has a rectangular cross section, extends for instance concentrically with the longitudinal axis 68, toward the closing body 129 of the shutoff valve 130. In certain operating states of the pressure modulator 45, the actuation pin 152 functions such that it lifts the closing body 129 from its valve seat 117 and thus establishes communication for the pressure fluid being the control chamber 118 and the second cylinder bore chamber 113 of the second cylinder bore 72. The length of the recess 142 of the direction of the longitudinal axis 68 from the bottom 143 to the face end 140 is greater than the length of the crossbar 148 in the direction of the longitudinal axis 68 in such a manner that when the crossbar 148 is resting on the bottom 143 and the face end 140 of the control tappet 131 is resting on the bearing end face 139 of the control piston 99, the axial length of the actuation pin 152 no longer suffices to lift the closing body 129 from the valve seat 117, so that the second compression spring 127 presses the closing body 129 against the valve seat 117 and closes the shutoff valve 130.

The mode of operation of the hydraulic brake system and of the pressure modulator 45 will now be explained in conjunction with FIGS. 1 and 2. If one of the vehicle wheels or more than one of the vehicle wheels is tending to lock, then sensors on the vehicle wheels, in a known manner, send signals to an electronic control unit, by which the inlet valves 13; 14, the outlet valves 25; 26, and the valve assembly 56 are moved electromagnetically, in a known manner, to a blocking position or an open position, resulting in a pressure modulation in the wheel brake cylinders 11, 12, 48, 51. The pressure modulator 45 makes possible an especially simple layout of the hydraulic brake system, since one electromagnetically actuatable valve assembly 56 can be disposed with for both the wheel brake cylinder 48 and the wheel brake cylinder 51.

If the driven vehicle wheel that can be braked by the wheel brake cylinder 48 is tending to lock, then the valve assembly 56 is moved electromagnetically to its blocking position. In that case, the pressure of the pressure fluid generated in the master cylinder 2 continues to be operative in the servo chamber 88 of the first cylinder bore 70, while in the first cylinder bore chamber 90 of the first cylinder 70, as a result of the communication with the wheel brake cylinder 51 of the other driven vehicle wheel, no further brake pressure can be built up. As a result of the pressure of the pressure fluid prevailing in the servo chamber 88, which pressure is rising on the master cylinder side because of the brake pedal actuation, a pressure force that tends to move the servo piston 83 with its tappet extension 92 in the direction of the second cylinder bore 72, and hence to move the control tappet 131 in the direction of the control piston 99, is exerted on the servo piston 83. In the control chamber 111 and the second cylinder bore chamber 113 of the second cylinder bore 72, upon an actuation of the wheel brake cylinder 48 to slow down the associated vehicle wheel, approximately the same pressure of the pressure fluid prevails, as long as the shutoff valve 130 disposed in the control piston 99 is in the open position; in other words, the actuation member 146 lifts the closing body 129 from its valve seat 117. As a function of the stroke of the control tappet 131 and of the axial position of the control piston 99 in the second cylinder bore 72, the shutoff valve 130 is opened by the contact of the actuation pin 152 of the actuation member 146 with the closing body 129, or closed by the spring force of the second compression spring 127 acting upon the closing body 129.

If the valve assembly 56 is now switched to its pressure reduction position, then pressure fluid flows out of the wheel brake cylinder 51 and the first cylinder chamber 90 into the return line 58. Because of the resultant pressure drop in the cylinder chamber 90, the pressure force of the pressure fluid in the servo chamber 88 on the servo piston 83 predominates, so that this servo piston displaces the control tappet 131 toward the control piston 99, and no later than now, the face end 140 of the control tappet 131 comes to rest on the bearing end face 139 of the control piston 99.

After a predetermined displacement of the control piston 99 by the control tappet 131 in the direction of the second closure plug 104, the shutoff valve 130 is closed, because the control tappet 131 has displaced the control piston 99 far enough that the closing body 129 is no longer lifted from its valve seat 117 by the actuation member 146, but instead rests tightly against the valve seat 117 because of the spring force of the second compression spring 127. By means of this further motion of the control piston 99 and the attendant increase in the volume of the second cylinder chamber 113, the pressure of the pressure fluid in the wheel brake cylinder 48 is reduced by the same extent as in the wheel brake cylinder 51. The first compression spring 119, which counteracts the motion of the piston linkage in the direction of the second closure plug 104, overcomes the frictional forces of the pressure modulator 45 and, after the valve assembly 56 has been switched back to its open position, in which the second line branch 54 communicates with the wheel brake cylinder 51, returns the piston linkage, comprising the servo piston 83, control tappet 131 and control piston 99, to its outset position.

If when the vehicle is started the danger arises that one of the vehicle wheels departs from its state serving the purpose of propulsion, or in other words if a loss of traction occurs, then this is detected in a known manner by a sensor and reported, by means of a signal of the electronic control unit 155, to at least one valve assembly associated with a driven wheel. The wheel brake cylinders 48, 51 are associated with the driven wheels of the vehicle and can be regulated individually and jointly. In the traction control situation of the driven wheel associated with the wheel brake cylinder 48, the first control valve 35 is switched to its closing position; the first inlet valve 13 remains in its open position; and the first outlet valve 25 is switched to its open position. The return pump 29, which is turned on at the same time, pumps pressure fluid from the master cylinder 2 via the first brake line branch 9 into the first brake line 3 and thus into the control chamber 111 of the second cylinder bore 72, and through the shutoff valve 130 which is in its open position pumps it into the second cylinder chamber 113 and from there to the wheel brake cylinder 48, as a result of which the associated driven wheel is braked. If a certain pressure value must be maintained or reduced into the wheel brake cylinder 48, then the first control valve 35 can be triggered in clocked fashion for the particular requirement. During traction control of the driven wheel associated with the wheel brake cylinder 51 and the traction control of both driven wheels, the second control valve 36 is switched to its closing position; the second inlet valve 14 remains in its open position; and the second outlet valve 26 and the valve assembly 56 are switched to their open positions. The return pump 30, turned on at the same time, aspirates pressure fluid from the master cylinder 2 via the second brake line branch 10 and pumps this pressure fluid into the wheel brake cylinder 51, via the second brake line branch 10 and the second line branch 54, and into the servo chamber 88 of the first cylinder bore 70, via the first line branch 53. The pressure of the pressure fluid becomes operative via the second brake line branch 50 in the first cylinder chamber 90 of the first cylinder bore 70 as well. The pressure modulator 45 is designed such that in this case the control tappet 131 is not moved toward the control piston 99.

If a certain pressure modulation is necessary within the wheel brake cylinder 51, then during the pressure holding phase the valve assembly 56 can be switched into its blocking position, and in the pressure reduction phase it can be switched into a return flow position, in which the pressure fluid can flow back in the direction of the return pump 30 by means of the valve assembly 56 and the return line 58. In order not to allow the pressure in the line system connected to the pressure side of the return pump 30, and hence in the servo chamber 88 of the first cylinder bore 70 as well, to rise undesirably, the first control valve 35 and the second control valve 36 are triggered in clocked fashion for the "pressure holding" and "pressure reduction" phases. The prevailing, regulated pressure in the wheel brake cylinder 51 and, via the second brake line segment 50, in the first cylinder chamber 90 remains insignificantly higher or lower than the pressure prevailing in the servo chamber 88. A substantial motion of the servo piston 83 as a consequence of a certain pressure difference resulting from the imposition of a high pressure on the servo piston in the servo chamber 88 and a low pressure in the first cylinder chamber 90 is averted.

Figure 7:
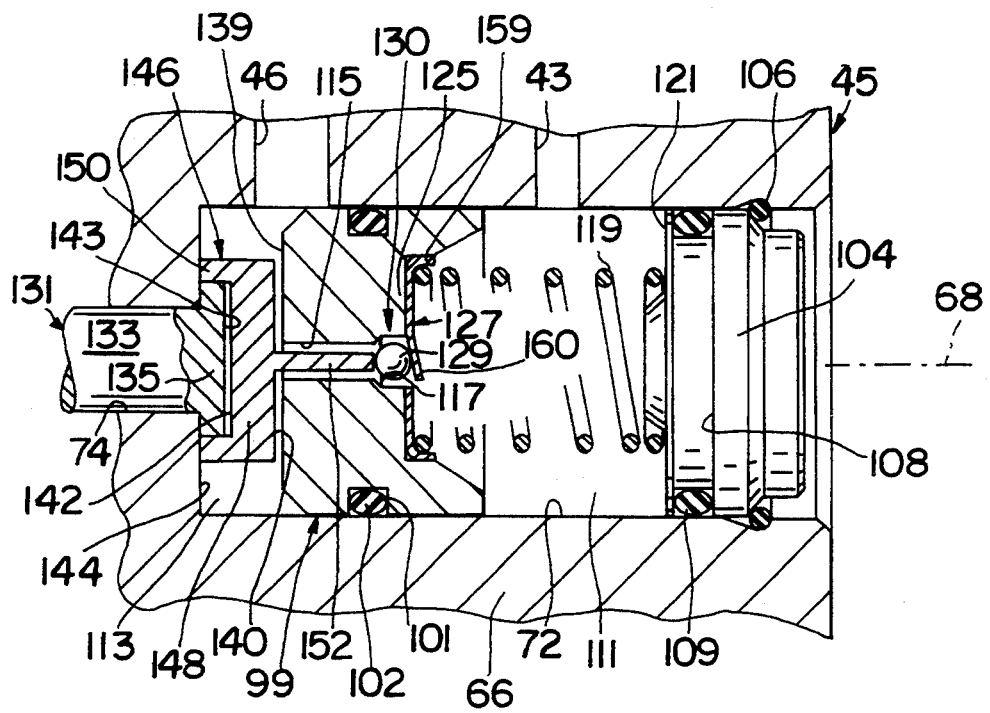
FIG. 7, a pressure modulator, shown in fragmentary form, in accordance with a second exemplary embodiment of the invention.

In FIG. 7, a second exemplary embodiment of a pressure modulator 45 according to the invention is shown in fragmentary fashion; identical elements and those that function the same as in FIGS. 1–6 are identified by the same reference numerals. Concentrically with the longitudinal axis 68, the control piston 99 has a continuous stepped longitudinal bore 115, in which a valve seat 117 is formed that tapers frustoconically toward the second control chamber 113. The first compression spring 119, for instance in the form of a helical spring, disposed between the control piston 99 and the second closure plug 104 rests with its one end on the second compression spring 127, formed as a leaf spring, which in turn rests on a retention shoulder 125, toward the second closure plug 104, of the stepped through bore 115 of the control piston 99. The compression spring 127 has a disklike base body 159, out of which a spring tongue 160 is cut that urges the closing body 129, which for instance is spherical, to move in the direction of the valve seat 117 of the shutoff valve 130. The compression spring 127, embodied as a leaf spring, replaces the spring plate 123 of the first exemplary embodiment, for instance shown in FIG. 2, of a pressure modulator 45 according to the invention.

Figure 8:
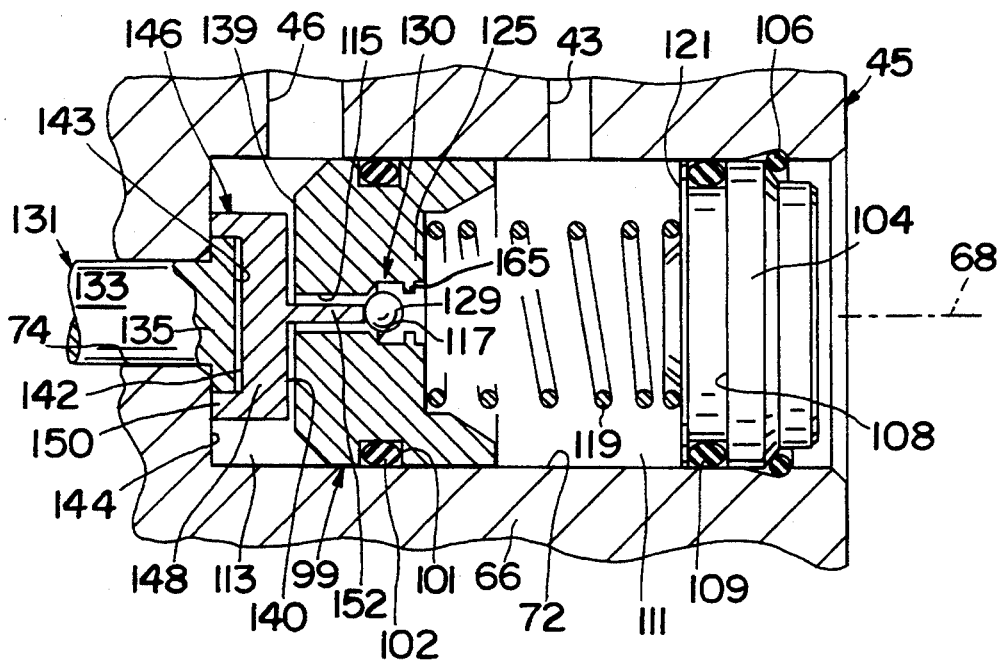
FIG. 8, a pressure modulator, shown in fragmentary form, in accordance with a third exemplary embodiment of the invention.

FIG. 8 shows part of a third exemplary embodiment of the invention of a pressure modulator 45, in which parts that are the same and function the same are identified by the same reference numerals as in FIGS. 1-7. The pressure modulator of the third exemplary embodiment differs from the first and second exemplary embodiments essentially only in that the second compression spring 127 of the shutoff valve 130 is omitted. The first compression spring 119 rests with one end on the face end 121 of the second closure plug 144 and with its other end directly on the retention shoulder 125 of the control piston 99. In the through bore 115 of the control piston 99, on its end toward the first compression spring 119, at least one and for instance two radially inward-pointing retention protrusions 165 are provided, which limit the stroke of the closing body 129 in the direction remote from the valve seat 117 and prevent the closing body 129 from falling out of the through bore 115. The pressure of the pressure fluid engaging the closing body 129 and prevailing in the control chamber 111 effects a pressure force that seeks to urge the closing body 29 in the direction of the valve seat 117 and thus to close the shutoff valve 130. The operation is the same as for the previously described shut-off valves.

The foregoing relates to a preferred exemplary embodiment of the invention, it being understood that other variants and embodiments thereof are possible within the spirit and scope of the inventions, the latter being defined by the appended claims.

I claim:

1. A pressure modulator (45) for a hydraulic brake system for a motor vehicle brake system, having a housing (66) which concentrically with a longitudinal axis has a first cylinder bore (70), a second cylinder bore (72) and a guide bore (74) that connects the first cylinder bore (70) with the second cylinder bore (72); a displaceable servo piston (83) disposed in the first cylinder bore (70); a displaceable control piston (99), disposed in the second cylinder bore (72), a first compression spring (119) acts upon said control piston in a direction of the servo piston (83); a shutoff valve (130), said shutoff valve has a valve seat (117), formed in a through bore (115) of the control piston (99), a closing body (129); an actuation member (146) which is disposed in a direction of the longitudinal axis between the closing body (129) and a face end (144) of the second cylinder bore (72) toward the servo piston (83); and a control tappet (131), said control tappet begins at the second cylinder bore (72), protrudes into the guide bore (74) and together with the servo piston (83) and the control piston (99) forms a piston linkage, the control tappet (131), on an end protruding from the guide bore (74), has an operative segment (135) that has a greater width than the inside width of the guide bore (74); that the operative segment (135), on its face end (140) toward the control piston (99), has an open recess (142) that is embodied in slitlike fashion for an axially movable reception of the actuation member (146); the actuation member (146) protrudes with a crossbar (148), extending vertically of the longitudinal axis (68), into the recess (142) of the control tappet (131), and that a length of the recess (142) in a direction of the longitudinal axis (68) is greater than the length of the crossbar (148) in the direction of the longitudinal axis (68), and at least two longitudinal bars (150) of the actuation member (146), which extend parallel to the longitudinal axis (68), begin at the crossbar (148) and extend in the direction of the face end (144) of the second cylinder bore (72) and fit over the control tappet (131) on its circumference.

2. A pressure modulator as defined by claim 1, in which beginning at the crossbar (148), an actuation pin (152) of the actuation member (146) extends in a direction toward the closing body (129) and protrudes into the through bore (115) of the control piston (99).

3. A pressure modulator as defined by claim 2, in which the actuation member (146) is embodied as a part stamped from a metal material.

4. A pressure modulator as defined by claim 1, in which the through bore (115) of the control piston (99) has at least one radially inward-pointing retention protrusion (165), and the closing body (129) is disposed between the valve seat (117) and the at least one retention protrusion (165).

* * * * *